(12) United States Patent
Reial et al.

(10) Patent No.: US 12,207,193 B2
(45) Date of Patent: Jan. 21, 2025

(54) USER EQUIPMENT RECEIVER FOR WAKE UP SIGNAL RECEPTION

(71) Applicant: Telefonaktiebolaget LM Ericsson (publ), Stockholm (SE)

(72) Inventors: Andres Reial, Lomma (SE); Sina Maleki, Malmö (SE); Pramod Jacob Mathecken, Lomma (SE); Gang Zou, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 568 days.

(21) Appl. No.: 17/419,042

(22) PCT Filed: Jan. 10, 2020

(86) PCT No.: PCT/EP2020/050579
§ 371 (c)(1),
(2) Date: Jun. 28, 2021

(87) PCT Pub. No.: WO2020/144350
PCT Pub. Date: Jul. 16, 2020

(65) Prior Publication Data
US 2022/0086756 A1    Mar. 17, 2022

Related U.S. Application Data

(60) Provisional application No. 62/791,123, filed on Jan. 11, 2019.

(51) Int. Cl.
*H04W 52/02* (2009.01)
*H04W 88/06* (2009.01)

(52) U.S. Cl.
CPC ... *H04W 52/0229* (2013.01); *H04W 52/0235* (2013.01); *H04W 88/06* (2013.01)

(58) Field of Classification Search
CPC ......... H04W 52/0229; H04W 52/0235; H04W 72/23; H04W 76/28; H04W 68/02;
(Continued)

(56) References Cited

U.S. PATENT DOCUMENTS

| 2007/0184811 A1 | 8/2007 | Ballantyne |
| 2013/0182587 A1 | 7/2013 | Sebeni et al. |

(Continued)

FOREIGN PATENT DOCUMENTS

| WO | 2018062787 A1 | 4/2018 |
| WO | 2018204799 A1 | 11/2018 |

OTHER PUBLICATIONS

3GPP, "3rd Generation Partnership Project; Technical Specification Group Radio Access Network; NR; Multiplexing and channel coding (Release 15)", 3GPP TS 38.212 V15.3.0, Sep. 2018, pp. 1-99.

(Continued)

*Primary Examiner* — Quoc Thai N Vu
(74) *Attorney, Agent, or Firm* — Murphy, Bilak & Homiller, PLLC

(57) ABSTRACT

A method in a User Equipment (UE), the method comprising determining one or more parameters of an expected signal; calculating a performance metric for each of a plurality of receiver modes of the UE, based on the determined one or more parameters; selecting a first receiver mode among the plurality of receiver modes based on the calculated performance metrics.

16 Claims, 10 Drawing Sheets

(58) Field of Classification Search
CPC . H04W 76/27; H04W 52/02; H04W 52/0274; H04W 52/241; H04W 88/02; H04W 88/06
See application file for complete search history.

(56) References Cited

U.S. PATENT DOCUMENTS

2019/0200296 A1\* 6/2019 Liu .................. H04W 52/0229
2020/0029302 A1\* 1/2020 Cox ................. H04W 56/0015

OTHER PUBLICATIONS

Interdigital, Inc., "On UE power consumption characteristics", 3GPP TSG RAN WG1 Meeting #94bis, R1-1811225, Chengdu, China, Oct. 8-12, 2018, pp. 1-3.
3GPP , "3rd Generation Partnership Project; Technical Specification Group Radio Access Network; Evolved Universal Terrestrial Radio Access (E-UTRA); Physical channels and modulation (Release 15)", 3GPP TS 36.211 V15.3.0, Sep. 2018, 1-237.

\* cited by examiner

USER EQUIPMENT RECEIVER FOR WAKE UP SIGNAL RECEPTION

TECHNICAL FIELD

The present disclosure generally relates to wireless communication systems and more specifically to adapting a User Equipment (UE)'s receiver for Wake Up signal (WUS) reception.

BACKGROUND

The main activity in RRC_CONNECTED mode for a UE is to monitor Physical Downlink Control CHannel (PDCCH) for the scheduled Physical Downlink Shared Channel (PDSCH).

To do so, the UE needs to decode all the PDCCH occasions/Time Frequency locations/configurations according to a search space. After decoding according to each blind decoding (BD) option, the UE can check whether the PDCCH was meant to be for the UE, based on the Cyclic Redundancy Check (CRC) using its cell-Radio Network Temporary Identifier (c-RNTI).

Wake-Up Signals (WUS) have been employed in Narrowband Internet of Things (NB-IoT) and Long Term Evolution-Machine Type Communication (MTC) (LTE-M) e.g. to wake up the UE ahead of paging occasions in the idle mode. In NB-IoT and LTE-M, a Zadoff-Chu (ZC) based sequence is used as the WUS. When the WUS is configured in a cell, and the UE supports the operation of WUS, the UE first detects the WUS prior to a transmission occasion of the PDCCH carrying Downlink Control Information (DCI). The DCI may be related to e.g. data transmission to the UE or paging transmission. If the WUS is detected, the UE proceeds to decoding the transmission of the DCI. If the WUS is not detected, the UE goes back to sleep. As the WUS is significantly shorter than the paging of the DCI and the paging load in NB-IoT and LTE-M is expected to be low, UE power can be saved.

UE power consumption is an important metric that needs to be enhanced. In general, significant power can be spent on monitoring the PDCCH in LTE based on one Discontinuous reception (DRX) setting from LTE field logs. The situation can be similar in New Radio (NR) if similar DRX settings with traffic modelling is utilized, as the UE needs to perform blind detection in its configured control resource sets (CORESETs) to identify whether there is a PDCCH sent to it, and then act accordingly. Techniques that can reduce unnecessary PDCCH monitoring or allowing UE to go to sleep or wake-up only when required can be beneficial.

The NR standard in the third Generation Partnership Project (3GPP) is being designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while the URLLC service requires low latency and high reliability transmissions but for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service, meaning that a mini-slot may be used for either eMBB, URLLC or other services.

For example, in FIG. 1, an exemplary radio resource in NR is illustrated. The radio resource can correspond to a grid in frequency and time, in which a resource element is the smallest entity. The resource element is composed of one sub-carrier and one OFDM symbol.

As mentioned above, the 3GPP defines the technical specifications for NR, e.g. 5G. In release 15 (Rel-15) NR, a user equipment (UE) can be configured with up to four carrier bandwidth parts (BWPs) in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Multiple orthogonal frequency-division multiplexing (OFDM) numerologies ($\mu$) are supported in NR as given by Table 1, where the subcarrier spacing ($\Delta f$) and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A downlink physical channel corresponds to a set of resource elements carrying information originating from higher layers. The following downlink physical channels are defined:
Physical Downlink Shared Channel, PDSCH;
Physical Broadcast Channel, PBCH;
Physical Downlink Control Channel, PDCCH.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmissions on PUSCH.

An uplink physical channel corresponds to a set of resource elements carrying information originating from higher layers. The following uplink physical channels are defined:
Physical Uplink Shared Channel, PUSCH;
Physical Uplink Control Channel, PUCCH;
Physical Random Access Channel, PRACH.

PUSCH is the uplink counterpart to the PDSCH. PUCCH is used by UEs to transmit uplink control information, including Hybrid Automatic Repeat Request (HARQ) acknowledgements, channel state information reports, etc. PRACH is used for random access preamble transmission.

Here are some exemplary contents of a DCI format 1_0 with CRC scrambled by C-RNTI/CS_RNTI:

Identifier for DCI formats—1 bits

The value of this bit field is always set to 1, indicating a DL DCI format

Frequency domain resource assignment—$\lceil \log_2(N_{RB}^{DL,BWP}(N_{RB}^{DL,BWP}+1)/2) \rceil$ bits $N_{RB}^{DL,BWP}$ is the size of the active DL bandwidth part in case DCI format 1_0 is monitored in the UE specific search space and satisfying the total number of different DCI sizes configured to monitor is no more than 4 for the cell, and the total number of different DCI sizes with C-RNTI configured to monitor is no more than 3 for the cell otherwise, $N_{RB}^{DL,BWP}$ is the size of CORESET 0.

Time domain resource assignment—4 bits as defined in Subclause 5.1.2.1 of [6, TS 38.214]

VRB-to-PRB mapping—1 bit according to Table 7.3.1.1.2-33

Modulation and coding scheme—5 bits as defined in Subclause 5.1.3 of [6, TS 38.214]

New data indicator—1 bit

Redundancy version—2 bits as defined in Table 7.3.1.1.1-2

HARQ process number—4 bits

Downlink assignment index—2 bits as defined in Subclause 9.1.3 of [5, TS 38.213], as counter DAI TPC command for scheduled PUCCH—2 bits as defined in Subclause 7.2.1 of [5, TS 38.213]

PUCCH resource indicator—3 bits as defined in Subclause 9.2.3 of [5, TS 38.213]

PDSCH-to-HARQ_feedback timing indicator—3 bits as defined in Subclause 9.2.3 of [5, TS38.213]

DRX (discontinuous reception) as shown in FIG. 2, in a simplified DRX operation, allows a UE to transition to lower power state where it is not required to receive any transmissions from the base station. There is an onDuration period during which the UE is awake and monitors for control channels. If there is no control message detected by the UE, an Inactivity timer begins, and the UE continues to monitor for control channels until a valid control message addressed to the UE is received or the Inactivity timer expires. If the UE receives a valid control message, it extends the Inactivity timer and continues to monitor the PDCCH. If the Inactivity timer expires, then the UE can stop receiving transmissions from the base station (e.g. no control monitoring) until the end of the DRX cycle. Typically, the DRX parameters are configured by RRC. The DRX parameters may include also Round Trip Time (RTT) related, HARQ related, etc. The Onduration period and the time duration during which the inactivity timer is running are generally referred to as active time.

In summary the following terms are typically associated with the DRX operation:

Active Time: Time related to DRX operation, during which the media access control (MAC) entity monitors the PDCCH.

DRX Cycle: Specifies the periodic repetition of the OnDuration followed by a possible period of inactivity (see FIG. 2).

Inactivity Timer: Generally refers to the number of consecutive PDCCH-subframe(s)/slots after the subframe/slot in which a PDCCH indicates an initial UL, DL or Side Link (SL) user data transmission for a MAC entity.

MAC entity is the medium access control entity, and there is one MAC entity per configured cell group, for example the master cell group and secondary cell group.

It should be noted that the DRX functionality is configured by RRC, which is typically operating on a slower scale than the MAC or Physical layer. Thus, the DRX parameter settings, and other parameters, cannot be changed quite adaptively through RRC configuration, especially if the UE has a mix of traffic types.

It is possible to consider a combination of wake-up signalling (WUS) and wake-up receiver (WUR) architectures which lead to reduction of power consumption in the UE. The idea is to consider sending a narrowband WUS from the network to the UE, preceding a DL scheduling. The WUS is received by a WUR with a power less than the standby power of a UE. Upon successful reception of the WUS, the WUR awakes the main UE receiver for normal operation of scheduling PDCCH decoding and PDSCH reception.

The WUS can be designed in different ways. The existing NR signals can be used as WUS, such as PDCCH DCIs, Channel State Information-Reference Signal (CSI-RS), Demodulation Reference Signal (DMRS) and so on. These signals have the advantage of keeping the standards as it is and do not entail a large burden on the network. However, usually the WUR can consume a non-negligible power for these signals. Therefore, other ways of designing the WUS is to design simple signals which lead to simple Receiver (RX) architectures.

Depending on the type of WUS, its bandwidth (BW), frequency, and so on, different RX architectures can be realized for the WUR. However, what they all have in common is that a WUR consumes significantly lower energy than the main UE receiver. Further, the delay between reception of a WUS and waking up the main receiver should be very small, and the transient energy to wake up the main receiver should not be very high to justify the use of WUR.

The network has the option to choose from a set of different WUS based on the UE WUR capabilities, the resulting miss detection and false alarm rates, power consumption, latency to wake up the main receiver, transient energy from RRC_Connected to WUR Sleep mode and vice versa, etc.

The WU-DCI is a DCI transmission that does not schedule PDSCH data or carry conventional DL signalling (e.g. DL HARQ or UL grant). The CRC may be scrambled with the C-RNTI of the targeted UE or a WUG-RNTI (wake-up group) where the UE has been configured.

In some embodiments, the DCI may carry some data (in some cases also dummy data or padding bits) and the UE receives the WU message by virtue of a successful CRC check using its C-RNTI or a WU-group-RNTI. In other embodiments, when group-WU is employed, i.e. the WU message targets a group of UEs, the DCI may additionally contain C-RNTI(s) of the targeted UEs in the group.

For WUS detection, the UE is operating in a low-power state, either in a permanent low-power state or in the low-power phase in its Connected mode DRX (CDRX) cycle. It may have its main receiver deactivated to operate a separate low-power receiver (e.g. a WUR), or it may operate its main receiver in a low-power mode. The UE may activate its low-power receiver according to the WU-DCI search space configuration and perform WU-DCI detection attempts according to it C-RNTI or the WUG-RNTI. In some embodiments, if an ultra-low-power WUR is used or if the WU-DCI search space implies frequent detection attempts, the low-power receiver may be continuously activated.

If the WU-DCI is detected, the UE powers up the full receiver used to receive the scheduling PDCCH and/or the PDSCH. The UE then searches for the scheduling PDCCH, given the configured WU-DCI-to-scheduling-DCI time offset and the search space for the scheduling PDCCH. Upon detecting the PDCCH, it receives the PDSCH accordingly. If the WU-DCI contained an indication of the number of transport blocks that will be used for the pending DL data, i.e. how many independent (i.e. excluding HARQ retransmissions) DL transmissions would be used for the DL data, the UE keeps the full receiver active until all the indicated (independent) PDSCH transmissions/transport blocks (including HARQ retransmissions) have been received. If the UE finds an indication in a scheduling DCI that the PDSCH transmission scheduled by the DCI is the last one for the DL data that triggered the gNB to transmit the WU-DCI, then the UE goes back to off-mode or other low-power/energy-saving state after receiving the PDSCH scheduled by the DCI (including possible HARQ retransmissions).

The process may be depicted graphically in FIG. 3.

The time diagram shows how the WU-DCI is only employed outside the on-time.

The WU-DCI monitoring power consumption in off-state may be significantly lower than for regular DCI monitoring during the on-state, since a different, low-power radio architecture may be used for narrow-BW signal reception, and other receive/transmit (RX/TX) functions in Radio Frequency (RF) and BaseBand (BB) are turned off. However, such a case requires that the gNB schedule the upcoming PDCCH transmission with a longer time offset from the WU-DCI, as the UE may take a few ms to ramp up its main receiver into operation mode. While in CDRX-on state, the upcoming PDCCH transmission can be scheduled with a much shorter time offset as the UE's main receiver is already in operation mode.

Reception of WUS-PDCCH/WUS-DCI may be performed using multiple different receiver structures. A UE may choose to base the detection on correlating the received sample sequence with a time-domain representation of the expected WUS signal contents. Alternatively, the UE may apply conventional demodulation and decoding to the received WUS, similar to any PDCCH receive processing.

SUMMARY

Currently there exists some challenges.

For example, a UE detecting a WUS-PDCCH in a conventional manner and performing PDCCH decoding will show relatively good detection performance and excellent False Alarm (FA) performance. However, the process requires full demodulator and decoder operation, which typically is associated with high power and energy consumption.

On the other hand, a UE employing a time-domain correlator receiver for WUS detection can save power at the expense of much weaker Receiver Operating Characteristics (ROC): an acceptable Miss-Detection (MD) probability may imply a high FA rate at lower signal to interference plus noise ratio (SINR) operating points.

Current receiver options thus need to choose between high WUS monitoring power or reliable WUS detection performance. There is therefore a need for new receiver structures and configurations that can provide reliable MD and FA performance at significant power savings compared to conventional PDCCH reception.

Some embodiments allow to overcome or mitigate the challenges as described above.

According to one aspect, some embodiments include a method performed by a wireless device for selecting a receiver mode in a receiver of the wireless device. The method comprises: determining one or more parameters of an expected signal; calculating a performance metric for each of a plurality of receiver modes of the UE, based on the determined one or more parameters; and selecting a first receiver mode among the plurality of receiver modes based on the calculated performance metric.

According to another aspect, some embodiments include a wireless device configured, or operable, to perform one or more functionalities (e.g. actions, operations, steps, etc.) as described herein.

In some embodiments, the wireless device may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the wireless device may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the wireless device, configure the processing circuitry to perform one or more functionalities as described herein.

The advantages/technical benefits of the embodiments of the present disclosure comprise providing a WUS/Go To Sleep (GTS)-PDCCH receiver structure that can provide the required MD/FA performance at lower power. In particular, the MD/FA combination inherent to full PDCCH decoding while operating at a lower average energy consumption can be achieved.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
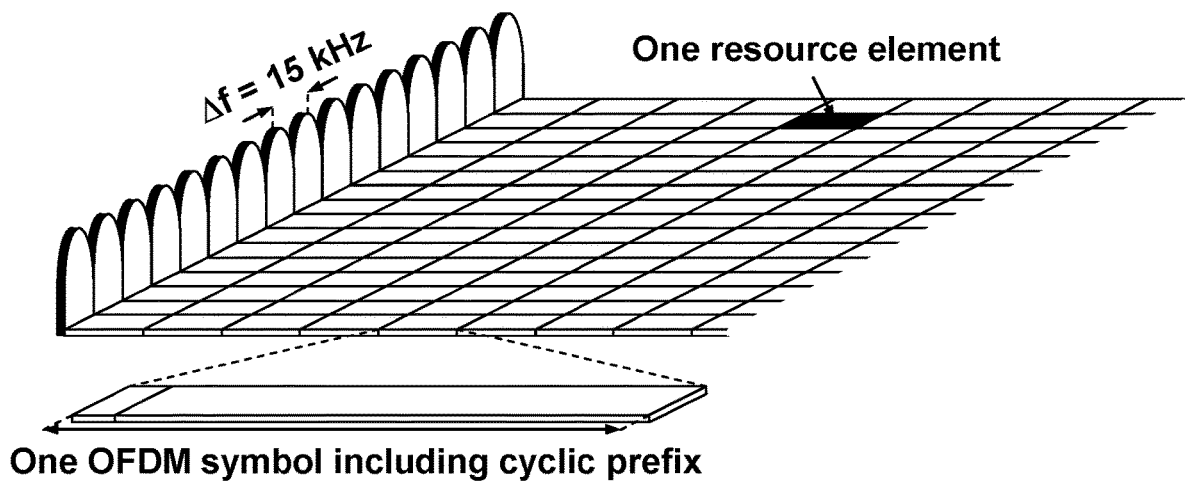
FIG. 1 illustrates an exemplary radio resource in New Radio.
Figure 2:
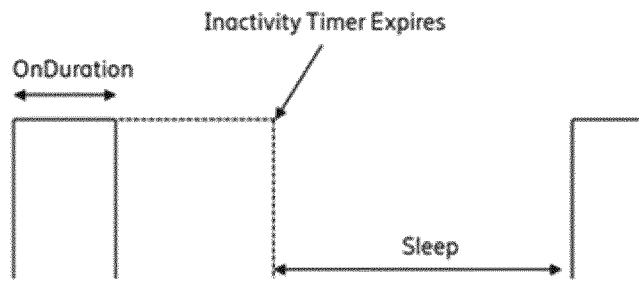
FIG. 2 illustrates an exemplary diagram of a DRX cycle.
Figure 3:
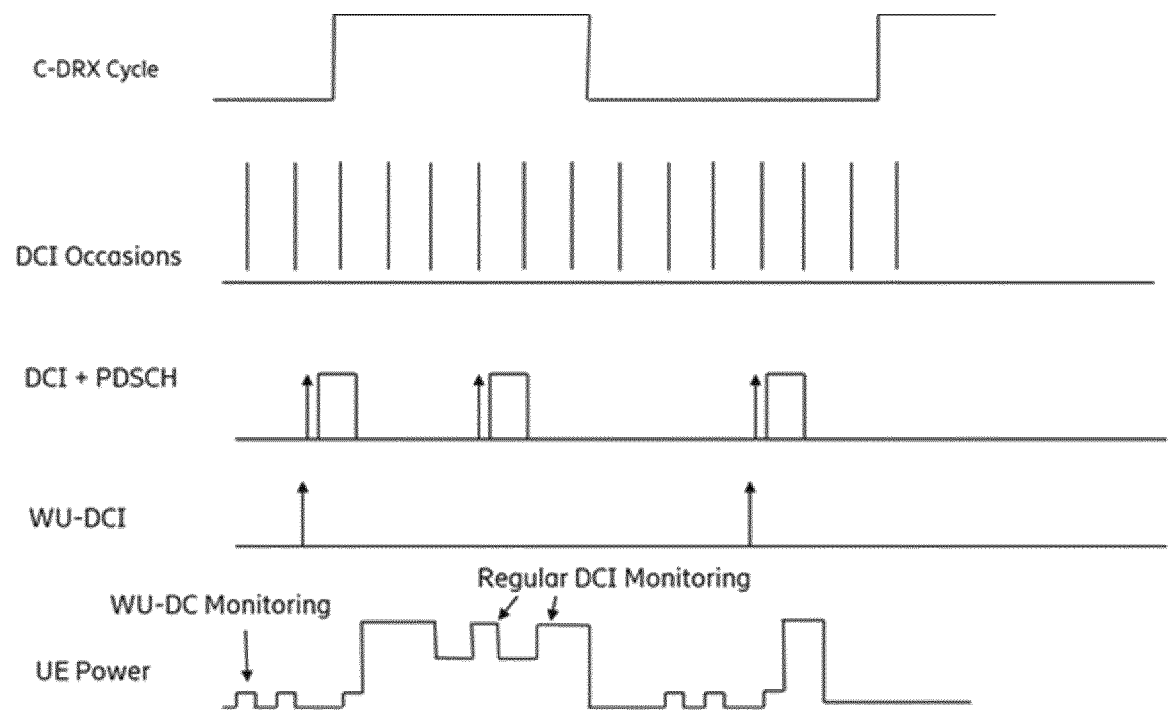
FIG. 3 illustrates a time diagram of different signals in DRX cycles.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments of the present disclosure provide several methods in the UE and the network node. Generally stated, a WUS-PDCCH receiver or WUR operates by selecting between multiple receiver modes and/or combining multiple receiver modes, based on performance metrics.

In some embodiments, multiple receiver modes are operated sequentially, i.e. a subsequent mode is activated based on the previous mode/stage's output. For example, the UE may first perform a correlator-based detection, using a low MD threshold. Upon detection, potentially with a poor FA rate, the decoder mode is run to reduce the FA. The MD threshold of the correlator can also be adjusted according to the output of the decoder to reduce FA.

In another embodiment, the receiver mode is selected based on channel conditions and the achievable FA rate. For example, in high SINR conditions, the correlator mode is selected, and in low SINR, the decoder mode is selected.

In some embodiments, the receiver mode selection process can be applied for Go To Sleep-PDCCH (GTS-PDCCH) detection.

It should be noted that WUS-PDCCH and WUS-DCI can be used interchangeably and mean the same thing in this disclosure.

Figure 4:
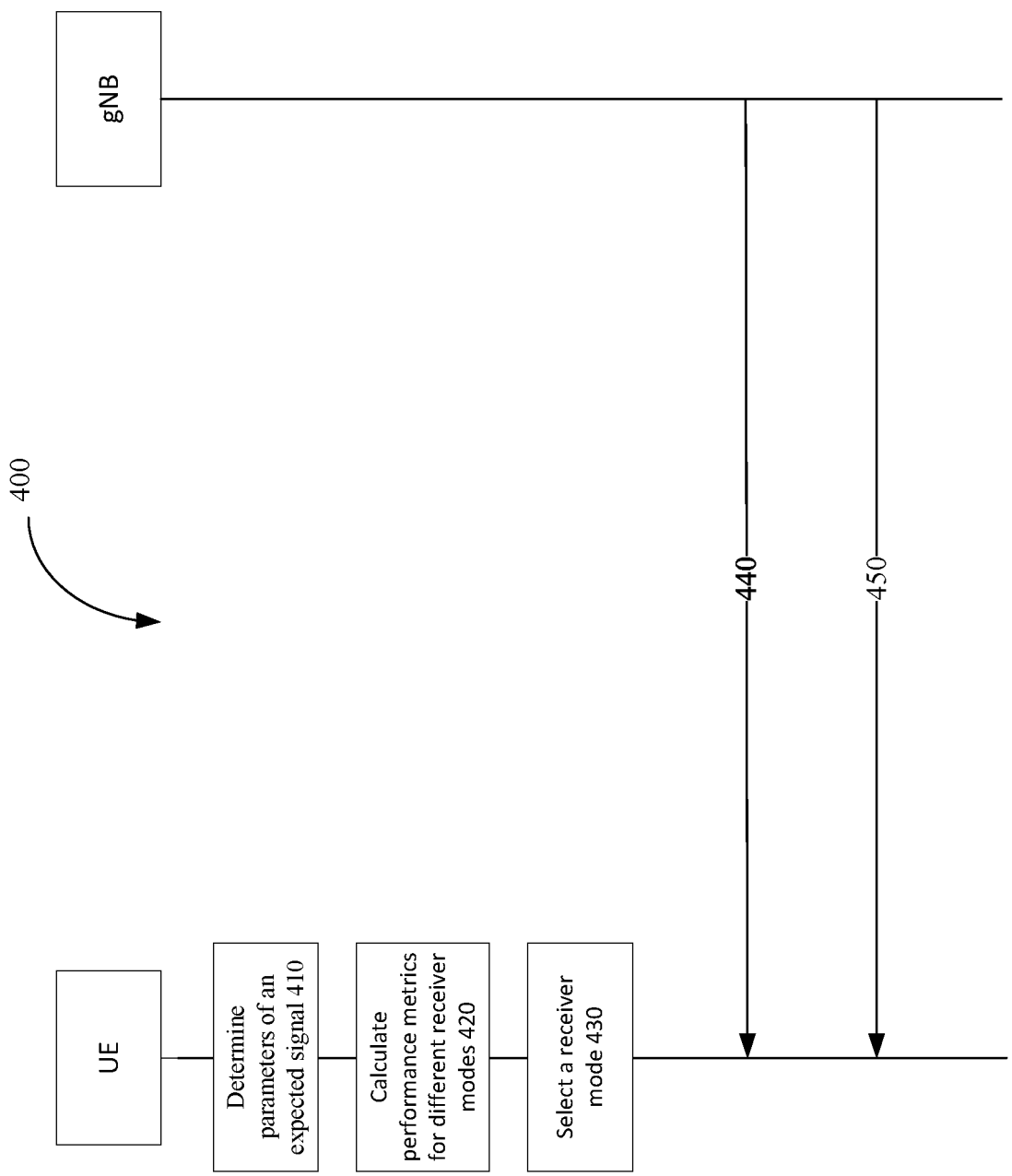
FIG. 4 is a signal flow diagram between a User Equipment and a base station, in accordance with embodiments of the present disclosure.

Now, turning to FIG. 4, a signaling diagram 400 between a UE and a base station (e.g. gNB) for handling WUS or GTS signals will be described.

In block 410, the UE determines one or more parameters of the expected signal. The expected signal could be a WUS or WUS-PDCCH or GTS signal, for example. The parameters may be the SINR of the WUS and/or the format of the WUS, for example. The determination is based on previous WUS transmissions or received Synchronization Signal Block (SSB), for example.

In block 420, the UE calculates the performance metrics for a plurality of receiver modes, based on the determined one or more parameters. The one or more performance metrics may comprise Receiver Operating Characteristics (ROC) such as MD and FA, for the determined WUS format and SINR. For example, the UE may determine the required performance metrics for the expected signal. The performance metrics may further comprise energy consumption of each receiver mode. For example, the UE can determine the achievable performance and power consumption metric (such as an average energy consumption) for each of the receiver mode in the plurality.

In block 430, the UE selects the receiver mode that yields the best performance metric among the different receiver modes. For example, the UE compares the calculated performance metrics (such as the average energy consumption) of each of the plurality of receiver modes and selects the receiver mode that yields the smallest energy consumption. The UE can use MD or FA rates/probabilities for comparison among the different receiver modes as well. Also, other performance metrics could be used for selecting a receiver mode. It should be noted that the selection of the receiver mode may be further based on channel conditions.

Furthermore, after the UE selects the receiver mode (a first receiver mode), the UE can select a second receiver mode, based on the output of the first receiver mode.

The gNB can send the expected signal (e.g. WUS) in step 440. The selected receiver mode of the receiver in the UE detects the WUS. Then, the UE wakes up to monitor for PDCCH. In step 450, the gNB sends the PDCCH to the UE.

Figure 5:
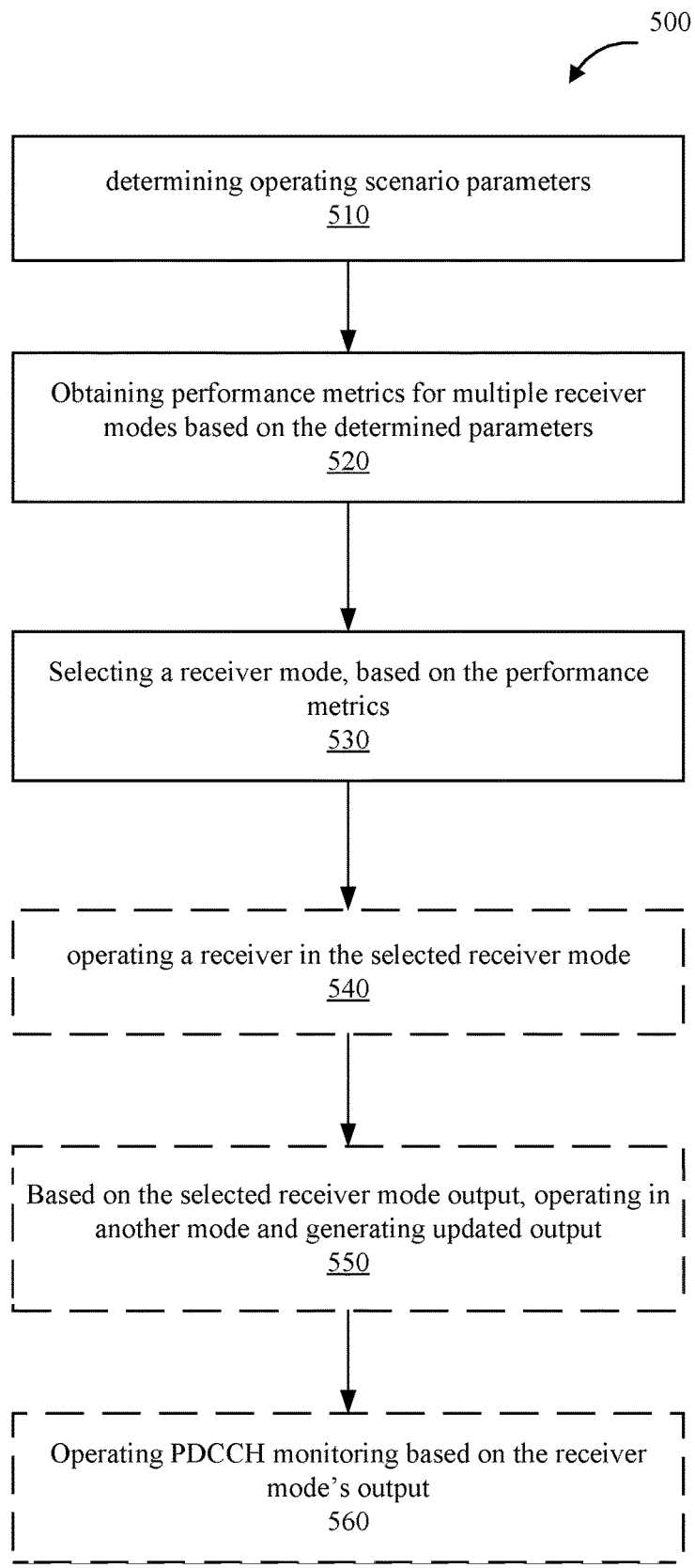
FIG. 5 illustrates a flow chart of a method in a User Equipment in accordance to embodiments of the present disclosure.

FIG. 5 illustrates a flow chart of a method 500 for selecting a receiver mode of a receiver in the UE. As mentioned above, the receiver can be a WUR of the UE, separate from the main receiver of a UE, or part of the main receiver. The receiver or WUR may operate in multiple modes. The method 500 can be performed in a UE, for example.

The method 500 comprises the following steps.

Step 510: Determining operating scenario parameters (or determining parameters of an expected signal).

Step 520: Obtaining performance metrics for multiple WUS receiver operating modes, based on the determined parameters, such as the operating scenario parameters.

Step 530: Selecting a receiver mode, based at least on the performance metrics.

Step 540: (Optional) Operating a receiver in the selected receiver mode.

Step 550: (Optional) Based on the selected receiver mode output, operating the receiver in another mode and generating updated output.

Step 560: (Optional) Operating the PDCCH monitoring process based on the selected receiver mode's output.

For example, in step 510, the scenario parameters could be, for example, the Signal to interference plus noise ratio (SINR) of the anticipated or expected WUS, or the WUS reception SINR, and/or the WUS format. The scenario parameters can be referred to as the parameters of the expected signal. These parameters can be estimated, based on e.g. received Synchronization Signal Block (SSB), data PDCCH/PDSCH, or previous WUS transmissions, for example. The WUS format information may be configured by the network via RRC or Media Access Control Control Element (MAC CE). The WUS format may include the WUS message length, the coding rate of the WUS, the aggregation level of the WUS, the bandwidth of the WUS, etc. The importance of energy savings and the required WUS reception performance may also be estimated, e.g. based on battery status and currently active bearers or traffic types, for example.

For instance, in step 520, the operating characteristics (ROC) for multiple WUS receiver (RX) modes for the obtained scenario parameters can be retrieved or estimated. They may be evaluated at the RX design time and stored in a form of a table, or some parameters may be estimated at the time of operation. The operating characteristics (ROC) may include performance metrics, such as the MD and FA characteristics for the WUS format and SINR operating point. The ROC may also include expected power or energy consumption for the receiver when operating in the candidate modes (e.g. a plurality of receiver modes).

For example, in step 530, the RX mode that meets the MD/FA requirements at the lowest energy consumption will be selected. The selection of the receiver mode may be further based on channel conditions. As examples, the different WUS receiver modes may include a decoding mode, a correlation mode, a combination of thereof, etc.

In one implementation of correlation mode or correlator mode, the received samples (containing the WUS and other signals) are time-domain correlated with a known reference signal that is the Time-domain representation of the WUS-PDCCH signal. Preferably, the WUS-PDCCH signal has known contents (known by the UE), only a small number of possible WUS messages being sent for a given UE. The correlator may perform a sliding correlation (if no high-quality Time-sync is available) or it may be correlating a single set of samples at a predetermined time instance (if high-quality Time-sync is available).

A correlator-based detector may be characterized by a ROC curve that describes the achievable MD/FA rate combinations for different SINR operating points. By setting the detection threshold appropriately, any of those achievable combinations may be selected. In the context of WUS detection, the MD is typically selected to be low enough so as not to interfere with the target Block Error Rate (BLER) for the scheduling of PDCCH.

The RX may operate at a bandwidth (BW) matching the width of the WUS. BandPass (BP) filtering of the carrier and matching the WUS-PDCCH Synchronization Signal (SS) can be performed. Lower-rate sampling may be applied to further reduce power consumption.

In other embodiments, the correlation may also be performed in the Frequency-domain.

In decoder mode, Frequency-domain processing is performed. Sufficiently accurate Time-sync is assumed to align the Fast Fourier Transform (FFT) window. An FFT is performed, WUS-PDCCH Resource elements (REs) are extracted, and regular demodulation and decoding are executed, including a C-RNTI (or other WUS-RNTI) check to determine that the WUS was meant for the UE.

In decoder mode, the MD is determined by code properties and the FA is determined by CRC length, for example. The effective ROC (a single point per an SINR value) provides typically a much better MD-FA trade-off than the correlator, but the power consumption is typically higher.

When the UE selects a receiver mode based on at least the energy consumption, the UE autonomously chooses a receiver mode. The autonomous operation of selecting a receiver mode is based on a mode selection logic and thresholds of performance determined offline and stored, for example. The parameters involved in the mode selection may also be adjusted based on previous PDCCH monitoring statistics online, for example.

In an alternative embodiment, the UE may receive the mode selection criteria and/or relevant threshold values from the network, e.g. from the serving gNB, via e.g. RRC or MAC CE signaling.

Yet, in another embodiment, the network may select the receiver mode that the UE should use, based on the UE capability report and other criteria important for the network, e.g. latency, and throughput.

As an example, in step 540, the RX performs WUS detection using the selected mode. In case the UE does not have immediate access to link quality measurements, e.g. if it employs a very low energy consuming WUR, in one embodiment, the UE can choose the RX mode for the worst case scenario (e.g. lowest WUS SINR).

As an example, in step 550, in some embodiments, the RX output may be used to determine whether the RX should be activated in a different mode. For example, if the first mode output indicates detection, but at a high FA level, the RX may use a different (second) mode that can reduce the FA probability.

As an example, in step 560, the UE operates its scheduling PDCCH monitoring process according to the WUS RX output. If the WUS RX output indicates detection, the UE monitors the PDCCH during a predetermined time window in relation to the detected WUS timing. The WUS-to-PDCCH gap is configured by the network or pre-determined. If no WUS is detected, PDCCH monitoring is omitted.

It should be noted that in method 500, the case where WUS-PDCCH only wakes up the UE is considered. No additional commands are provided.

Now some exemplary implementations of method 500 will be described.

A first exemplary embodiment is WUS receiver mode selection based on channel conditions.

It is assumed that, for a determined SINR operating point, the correlation detector provides the required MD probability Pmd and FA probability Pfa1. The WU-PDCCH decoder stage (i.e. channel decoder) is activated when the correlation detector triggers and provides very low FA probability Pfa2. Let the energy consumed per PDCCH occasion for WU-PDCCH sampling be E0, correlation detection E1, for WU-PDCCH decoding E2, energy for scheduling PDCCH sampling and decoding Ec, and energy for PDSCH sampling and decoding Ed. These parameters are available based on the UE design and may be determined during UE production tests and stored in a table. They can also be updated by the UE during its operation.

Let the UE be scheduled for PDSCH, and a WUS transmitted on the fraction Pt of its scheduling PDCCH occasions. The Pt parameter may be estimated by the UE e.g. based on recent scheduling history. In another approach, the network can communicate this parameter to the UE based on the history measurements during RRC-IDLE/Inactive states or more dynamic measurements during RRC-Connected state.

The different RX modes need to meet the required Pmd, but depending on their ROC, they yield different Pfa values. Using their Pfa values and energy consumption values, the RX mode that yields the most energy-efficient value may be determined.

With a correlation detector, the average energy ($E_X$) consumed per PDCCH occasion is given as follows (assuming independence of scheduling and FA events, which should be OK if both are relatively low):

$$EX = E0 + E1 + Pfa1*Ec + (1-Pmd1)*Pt*(Ec+Ed). \quad \text{Equation (1)}$$

Using the decoder, the average energy (EY) consumed per PDCCH occasion is:

$$EY = E0 + E2 + Pfa2*Ec + (1-Pmd2)*Pt*(Ec+Ed). \quad \text{Equation (2)}$$

Another option is not to detect the WUS at all and always monitor the scheduling PDCCH, in which case, the average energy (EZ) consumed per PDCCH occasion is given by:

$$EZ = Ec + Pt*Ed. \quad \text{Equation (3)}$$

The WUS RX mode is then selected by choosing the mode that yields the lowest total energy option (between $E_X$, $E_Y$, $E_Z$ for example).

Likely example outcomes may be that the decoder mode is selected for low SINR (high Pfa1), the correlator mode for high SINR (low Pfa2), and no-WUS for frequent scheduled PDCCH (high Pt).

A second exemplary embodiment is RX operation conditionally invoking multiple modes.

Since the WUS RX energy consumption is lower in the correlator mode, an initial detection of WUS may be performed using that mode. The detection threshold may be set low enough so as to reach the required MD probability. For low-to-medium SINR operating points, this will however lead to a poor FA performance. One way to reduce the FA is to operate the decoder stage, where the FA is determined by the CRC length Lcrc, Pfa≈$2^{-Lcrc}$. As such, a multi-mode detection option can be selected.

The criteria for invoking the multi-mode option can be formulated as follows, using the same notation as in the first exemplary embodiment above. It should be noted that in the case of a multi-mode receiver, the different modes can be referred to as stages. For example, a first mode decoder could be referred to as a one-stage decoder, two modes decoder could be referred to as a two-stage decoder, and so on.

With correlation only (e.g. the correlation detector), the average energy consumed per PDCCH occasion is, again:

$$E_X = E0 + E1 + Pfa1*Ec + Pt*(Ec+Ed), \quad \text{Equation (4)}$$

whereas with the additional decoding stage, the average energy consumed is:

$$E_Y = E0 + E1 + (Pt+(1-Pt)*Pfa1)*E2 + (Pt+(1-Pt)* \\ Pfa2)*(Ec+Ed) \approx E0 + E1 + (Pt+(1-Pt)*Pfa1)*E2 + \\ Pt*(Ec+Ed). \quad \text{Equation (5)}$$

If Pfa1*Ec>(Pt+(1-Pt)*Pfa1)*E2, which is likely the case since E2 is only baseband signal sampling while Ec involves full-BW signal sampling, the two-stage detection process for the WUS will provide a power advantage.

The average energies consumed, $E_X$ and $E_Y$, can be further compared to no WUS: $E_Z = Ec + Pt*Ed$.)

Alternatively, the average energy consumed (e.g. power budget) can be kept but the Pmd value is reduced.

In most practical cases, it can be assumed that Ec>E2.

The righthand side of $E_Y$ (equation 5) is a monotonically non-decreasing function of Pt for a fixed Pfa1. Therefore, if Pfa1*Ec>E2, the two-stage case is more energy efficient, which can be accommodated by a sufficiently large Pfa1, which also ensures a low Pmd1.

For some ROC criteria and energy consumption values, the conclusion may be that it is always better to just resort to decoding WU-PDCCH. However, with other ROC criteria and energy consumption values, different modes may be invoked for different SNR regions. Just having one-stage decoder, the UE energy is E=E0+E2+Pfa2*Ec+Pt*(Ec+Ed). While with 2-stage WUS detection (correlator+decoder), the UE energy consumption is E≈E0+E1+(Pt+(1-Pt)* Pfa1)*E2+Pt*(Ec+Ed). It is assumed that Pfa2 is very low. To compare the energy consumption between the one-stage decoder and the two-stage decoder, a comparison between E2 and E1+(Pt+(1-Pt)*Pfa1)*E2 is needed. To secure lower energy efficiency in the two-stage case, E1 shall be much lower than E2.

Another option is also to have a sufficiently low Pfa1, which will still lead to a virtually zero Pmd1 (this is possible if the correlation is high enough) under which Pfa1*Ec<E2. In this case, depending on the value of Pt, the one-stage with the correlator receiver can become more energy efficient (motivating the simpler receiver implementation). Otherwise, it seems that it is better to use either a single stage with decoding or a two-stage decoder.

In some scenarios, e.g. if the energy savings from the two-stage operation are small or the performance differences are large, it may be preferable to either resort to a single stage with correlation or a single stage with decoding, depending on Pt and how low the value of Pfa1 can get, while having Pmd1>0.

A further Exemplary embodiment is a combination of the first exemplary embodiment and the second exemplary embodiment.

The first and the second exemplary embodiments may be aggregated. One example for the mode selection may be:
(a) to determine the achievable operating points {Pmd, Pfa1} and {Pmd, Pfa2}; and
(b) to compare the following energy consumption and select the mode with the minimal energy consumption:

$$\text{WUS Correlator only: } E_X = E0 + E1 + Pfa1*Ec + Pt*(Ec+ \\ Ed) \quad \text{Equation (6)}$$

$$\text{WUS Decoder only: } E_Y = E0 + E2 + Pfa2*Ec + Pt*(Ec+ \\ Ed) \quad \text{Equation (7)}$$

$$\text{WUS Correlator+decoder: } E_A \approx E0 + E1 + \\ (Pt+(1-Pt)*Pfa1)*E2 + Pt*(Ec+Ed) \quad \text{Equation (8)}$$

$$\text{No WUS detection: } E_Z = Ec + Pt*Ed \quad \text{Equation (9)}$$

Note that, at some SINR points, some receiver options (e.g. the correlation receiver) may not be able to guarantee sufficient performance Pmd, in which case, they are excluded from the comparisons. Equivalently, they may yield Pfa≈1, in which case, the WUS RX stage effectively become superfluous and should not be considered as an option.

In the exemplary embodiments above, the detection of WUS was mostly focused in one single WUS occasion. However, the network may decide to send multiple consecutive WUSs in a time window to improve the robustness of WUS detection. As such, the MD can be reduced, while it is possible to keep the FA at the acceptable level. For example, if a decoding-based detector for each of the WUSs is used, the MD can be roughly estimated to be 0.01 (based on the standard BLER), and the FA can be close to zero. Therefore, if the same detector is applied to two occasions, the MD can be further reduced to 0.0001, while the FA remains close to zero.

In the case of multiple WUS occasions, a combination of the methods above (any of the above-described exemplary implementations of method 500) can be applied to the detection of each of the WUSs (e.g. decoder based, or correlator based, or a two-stage mechanism), while satisfying the total MD and FA criteria. To select a receiver mode between the different receiver options, the UE can make the decision based on the lowest energy consumption as described above.

In some additional embodiments, the RF/BB front end operations and their energy impact, E0, may differ for the different candidate receiver modes. The analysis above may be generalized in a straightforward manner to account for those differences.

In the above, different receiver modes were provided as examples, such as a correlator-based detector, a decoder-based detector, or a two-stage detector based on the correlator-based detector and decoder-based detector. The same techniques for selection of the receiver mode for WUS can readily be applied in other receiver options, and/or with more than two stages.

The discussion above is focused on detecting a WUS (wake-up signal), i.e. an indication that the UE should monitor its configured scheduling PDCCH in the near future. Alternatively, a GTS (go-to-sleep signal) may be transmitted by the network to indicate that the UE will not be scheduled in the near future. GTS detection is also preferably performed with a minimal power and energy consumption. In both cases (WUS and GTS), it is important for the network efficiency and UE Transmission Point (TP) that the UE does not miss scheduled occasions due to missing the WUS (or GTS signal). The parameters for a WUS or a GTS signal may be signal format, code rate, the required SINR or actual SINR of the WUS or the GTS signal, etc. An important difference between the WUS and the GTS is that, for WUS, the critical performance metric is the MD probability, while, for GTS, it is the FA probability. It should be avoided that a UE erroneously detects a GTS signal and omits PDCCH reception, thus resulting in one or more lost packets.

The above embodiments may be reused for GTS detection, but the role of MD and FA characteristics will be inverted. The receiver configuration on the ROC will be chosen so as to achieve the required FA performance Pfa. MD events will only lead to unnecessary PDCCH monitoring by the UE, but not lost packets.

The decision metrics for the different receiver modes then become the following, where:

$$\text{GTS Correlator only: } E = E0 + E1 + Pmd1 \cdot Ec + Pt \cdot (Ec+Ed) \quad \text{Equation (10)}$$

$$\text{GTS Decoder only: } E = E0 + E2 + Pmd2 \cdot Ec + Pt \cdot (Ec+Ed) \quad \text{Equation (11)}$$

$$\text{GTS Correlator+decoder: } E \approx E0 + E1 + (Pt + (1-Pt) \cdot Pfa1) \cdot E2 + (Pt + (1-Pt) \cdot Pmd2) \cdot (Ec+Ed) \quad \text{Equation (12)}$$

$$\text{No GTS detection: } E = Ec + Pt \cdot Ed \quad \text{Equation (13)}$$

In some SINR conditions, it may not be possible to achieve a low Pfa rate and a useful Pmd1 rate simultaneously for the correlator mode. That mode can be then excluded from the receiver mode selection.

Generally stated, the teachings of this disclosure may be applicable to receiving any signals that are encoded using channel encoder (e.g. forward error correction (FEC)).

Figure 6:
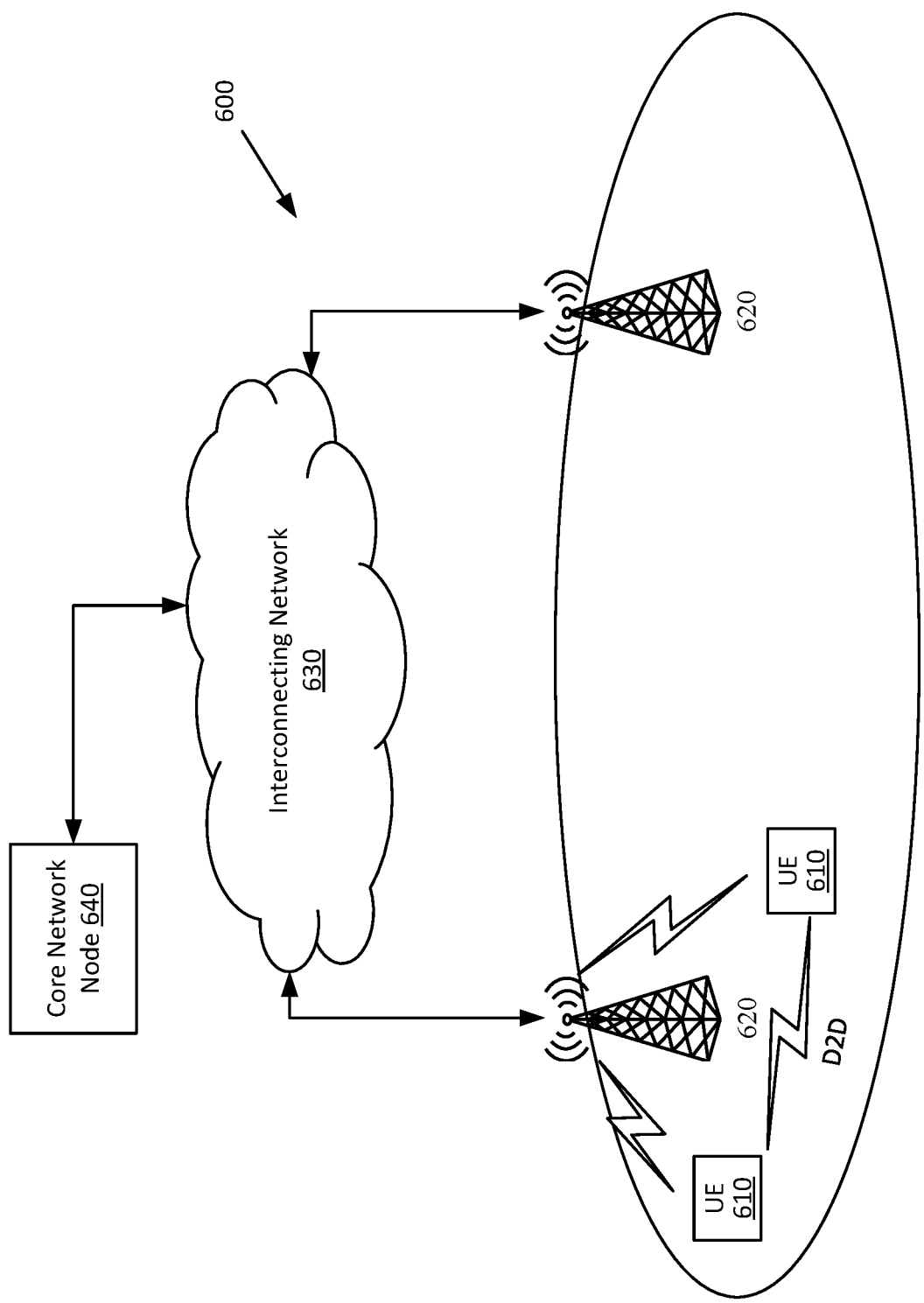
FIG. 6 illustrates one example of a wireless communications system in which embodiments of the present disclosure may be implemented.

FIG. 6 illustrates an example of a wireless network 600 that may be used for wireless communications. Wireless network 600 includes UEs 610 and a plurality of radio network nodes 620 (e.g., Node Bs (NBs) Radio Network Controllers (RNCs), evolved NBs (eNBs), next generation NB (gNBs), etc.) directly or indirectly connected to a core network 630 which may comprise various core network nodes. The network 600 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 610 may be capable of communicating directly with radio network nodes 620 over a wireless interface. In certain embodiments, UEs may also be capable of communicating with each other via device-to-device (D2D) communication. In certain embodiments, network nodes 620 may also be capable of communicating with each other, e.g. via an interface (e.g. X2 in LTE or other suitable interface).

As an example, UE 610 may communicate with radio network node 620 over a wireless interface. That is, UE 610 may transmit wireless signals to and/or receive wireless signals from radio network node 620. The wireless signals may contain voice traffic, data traffic, control signals, and/or any other suitable information. In some embodiments, an area of wireless signal coverage associated with a radio network node 620 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc. Example embodiments of a wireless device 610 are described in more detail below with respect to FIGS. 7 and 8.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 620 may interface with a radio network controller (not shown). The radio network controller may control network nodes 620 and may provide certain radio resource management functions, mobility management functions, and/or other suitable functions. In certain embodiments, the functions of the radio network controller may be included in the network node 620. The radio network controller may interface with the core network node 640. In certain embodiments, the radio network controller may interface with the core network node 640 via the interconnecting network 630.

The interconnecting network 630 may refer to any interconnecting system capable of transmitting audio, video, signals, data, messages, or any combination of the preceding. The interconnecting network 630 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 640 may manage the establishment of communication sessions and various other functionalities for wireless devices 610. Examples of core network node 640 may include MSC, MME, SGW, PGW, O&M, OSS, SON, positioning node (e.g. E-SMLC), MDT node, etc. Wireless devices 110 may exchange certain signals with the core network node 640 using the non-access stratum layer. In non-access stratum signaling, signals between wireless devices 610 and the core network node 640 may be transparently passed through the radio access network. In certain embodiments, network nodes 620 may interface with one or more other network nodes over an internode interface. For example, network nodes 620 may interface each other over an X2 interface.

Although FIG. 6 illustrates a particular arrangement of network 600, the present disclosure contemplates that the various embodiments described herein may be applied to a variety of networks having any suitable configuration. For example, network 600 may include any suitable number of wireless devices 610 and network nodes 620, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

Figure 7:
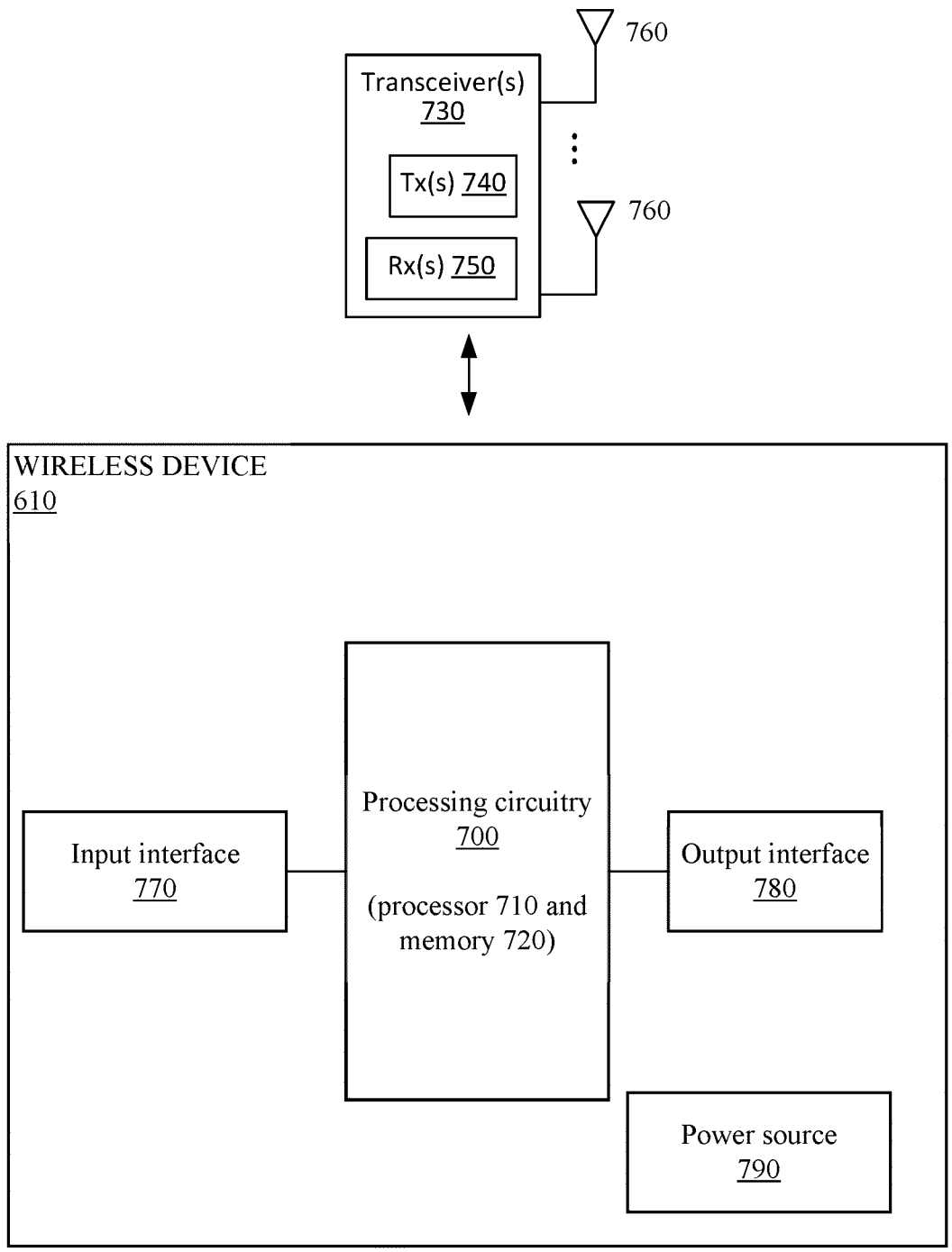
FIGS. 7 and 8 are block diagrams that illustrate a wireless device according to some embodiments of the present disclosure.

FIG. 7 is a schematic block diagram of the wireless device 610 according to some embodiments of the present disclosure. As illustrated, the wireless device 610 includes circuitry 700 comprising one or more processors 710, e.g., Central Processing Units (CPUs), Application Specific Integrated Circuits (ASICs), Field Programmable Gate Arrays (FPGAs), and/or the like) and memory 720. The wireless device 610 also includes one or more transceivers 730 that each include one or more transmitters 740 and one or more receivers 750 coupled to one or more antennas 760. The receivers 750 may operate in different modes, as mentioned above, or one of the receivers 750 may be a WUR. The wireless device 610 may also comprise a network interface and more specifically an input interface 770 and an output interface 780 for communicating with other nodes. The wireless device may also comprise a power source 790.

In some embodiments, the functionality of the wireless device 610 described above may be fully or partially implemented in software that is, e.g., stored in the memory 720 and executed by the processor(s) 710. For example, the processor 710 is configured to perform method 500 of FIG. 5.

In some embodiments, a computer program including instructions which, when executed by the at least one processor 710, causes the at least one processor 710 to carry out the functionality of the wireless device 610 according to any of the embodiments described herein is provided (e.g. method 500 of FIG. 5). In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
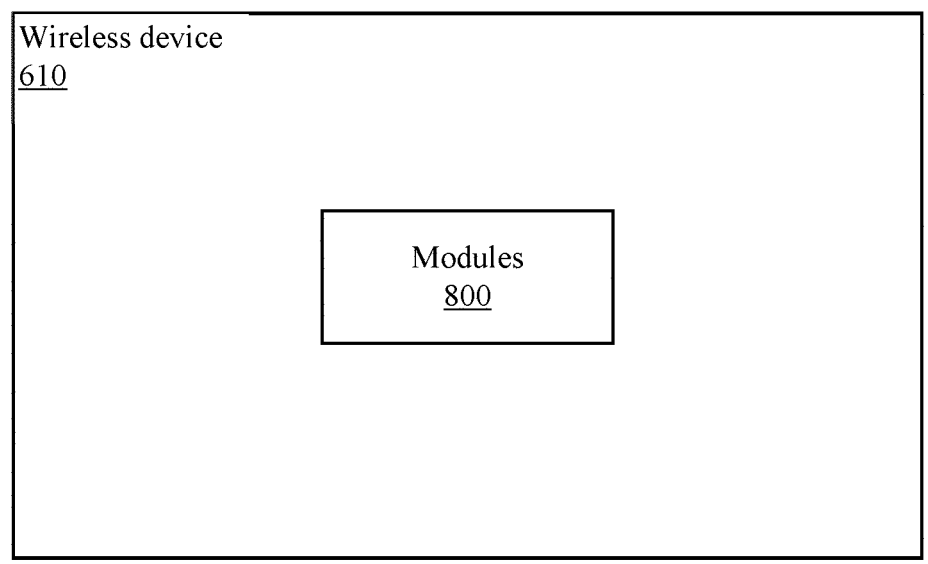

FIG. 8 is a schematic block diagram of the wireless device 610 according to some other embodiments of the present disclosure. The wireless device 610 includes one or more modules 800, each of which is implemented in software. The module(s) 800 provide the functionality of the wireless device 610 described herein. The module(s) 800 may comprise, for example, a determining module operable to perform step 510 of FIG. 4. The module(s) 800 may further comprise an optional operating module operable to perform steps 540 and 550 and 560 of FIG. 5. The module(s) 800 may further comprise an obtaining module operable to perform step 520 of FIG. 5 and a selecting module operable to perform step 530 of FIG. 5.

Figure 9:
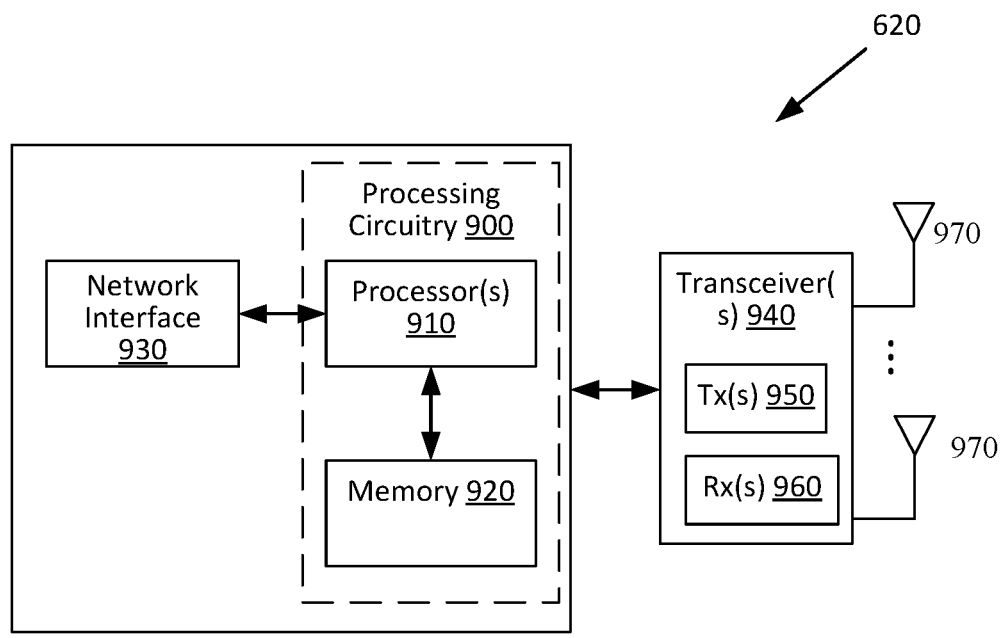
FIGS. 9 and 10 are block diagrams that illustrate a network node according to some embodiments of the present disclosure.

FIG. 9 is a schematic block diagram of a network node 620 according to some embodiments of the present disclosure. As illustrated, the network node 620 includes a processing circuitry 900 comprising one or more processors 910 (e.g., CPUs, ASICs, FPGAs, and/or the like) and memory 920. The network node also comprises a network interface 930. The network node 620 also includes one or more transceivers 940 that each include one or more transmitters 950 and one or more receivers 960 coupled to one or more antennas 970. In some embodiments, the functionality of the network node 610 described above may be fully or partially implemented in software that is, e.g., stored in the memory 920 and executed by the processor(s) 910.

Figure 10:
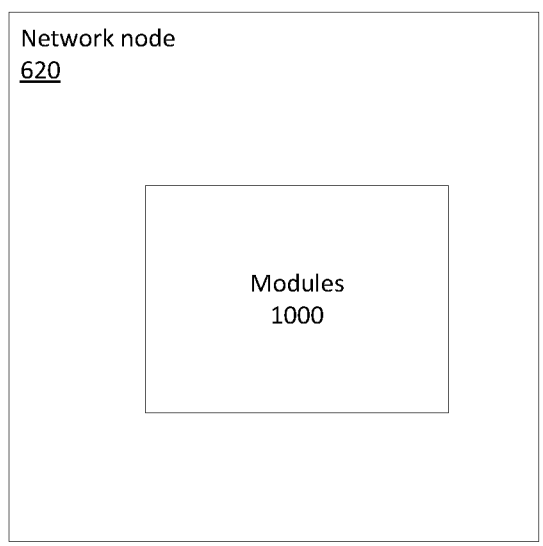

FIG. 10 is a schematic block diagram of the network node 620 according to some other embodiments of the present disclosure. The network node 620 includes one or more modules 1000, each of which is implemented in software. The module(s) 1000 provide the functionality of the network node 620 described herein.

Figure 11:
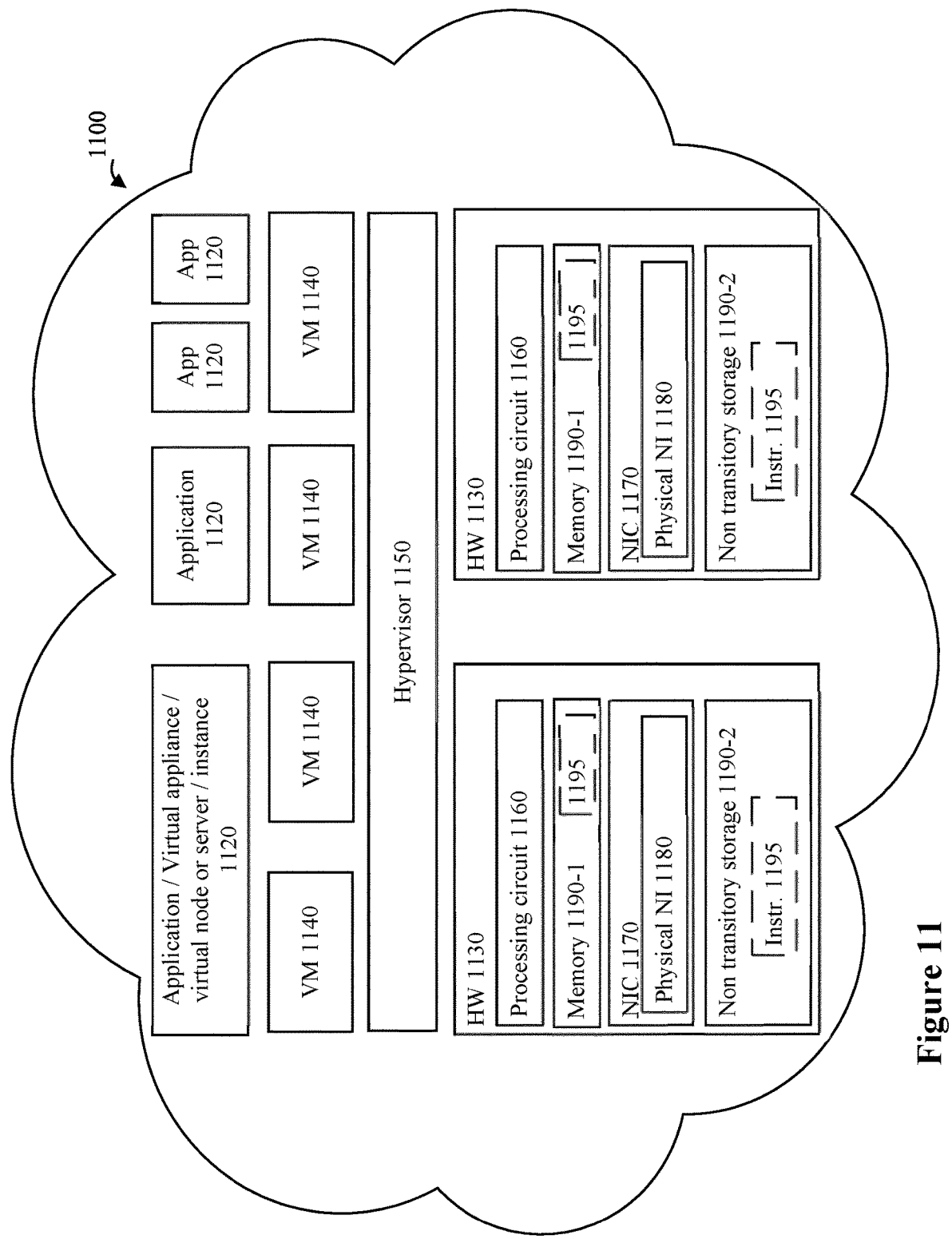
FIG. 11 illustrates a virtualized environment of a network node, according to some embodiments of the present disclosure.

FIG. 11 is a schematic block diagram that illustrates a virtualized embodiment of the wireless device 610 or network node 620, according to some embodiments of the present disclosure. As used herein, a "virtualized" node 1100 is a network node 620 or wireless device 610 in which at least a portion of the functionality of the network node 620 or wireless device 610 is implemented as a virtual component (e.g., via a virtual machine(s) executing on a physical processing node(s) in a network(s)). For example, in FIG. 11, there is provided an instance or a virtual appliance 1120 implementing the methods or parts of the methods of some embodiments. The one or more instance(s) runs in a cloud computing environment 1100. The cloud computing environment provides processing circuits 1130 and memory 1190-1 for the one or more instance(s) or virtual applications 1120. The memory 1190-1 contains instructions 1195 executable by the processing circuit 1160 whereby the instance 1120 is operative to execute the methods or part of the methods described herein in relation to some embodiments.

The cloud computing environment 1100 comprises one or more general-purpose network devices including hardware 1130 comprising a set of one or more processor(s) or processing circuits 1160, which may be commercial off-the-shelf (COTS) processors, dedicated Application Specific Integrated Circuits (ASICs), or any other type of processing circuit including digital or analog hardware components or special purpose processors, and network interface controller(s) (NICs) 1170, also known as network interface cards, which include physical Network Interface 1180. The general-purpose network device also includes non-transitory machine readable storage media 1190-2 having stored therein software and/or instructions 1195 executable by the processor 1160. During operation, the processor(s)/processing circuits 1160 execute the software/instructions 1195 to instantiate a hypervisor 1150, sometimes referred to as a virtual machine monitor (VMM), and one or more virtual machines 1140 that are run by the hypervisor 1150.

A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine 1140, be it hardware 1130 dedicated to that virtual machine 1140 and/or time slices of hardware 1130 temporally shared by that virtual machine 1140 with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1120 may be implemented on one or more of the virtual machine(s) 1140, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

The invention claimed is:

1. A method in a user equipment (UE), the method comprising:
determining one or more parameters of an expected signal;
calculating a performance metric for each of a plurality of receiver modes of the UE, based on the determined one or more parameters, wherein the plurality of receiver modes comprises two or more of a correlator mode, a decoder mode, a correlator and decoder mode, and a no signal detection mode; and
selecting a first receiver mode among the plurality of receiver modes based on the calculated performance metrics.

2. The method of claim 1, further comprising receiving the expected signal.

3. The method of claim 2, further comprising operating the receiver in the selected first receiver mode to receive the expected signal.

4. The method of claim 1, wherein the performance metric comprises one of: energy consumption, Miss Detection (MD) probability, and False alarm (FA) probability.

5. The method of claim 4, wherein selecting a first receiver mode comprises selecting a receiver mode that has the best performance metric among the calculated performance metrics.

6. The method of claim 5, wherein the receiver mode that has the best performance metric yields the smallest energy consumption.

7. The method of claim 1, further comprising determining a second one of the plurality of receiver modes based on an output of the first receiver mode.

8. The method of claim 7, further comprising operating the receiver in the first and the second receiver mode sequentially, and the second receiver mode is activated based on the output of the first receiver mode.

9. The method of claim 1, wherein the expected signal is a Wake Up signal (WUS) and the one or more parameters of the expected signal comprise the signal to interface plus noise radio (SINR) of the WUS and/or the format of the WUS.

10. The method of claim 1, wherein the expected signal is a Go-To-Sleep (GTS) signal.

11. The method of claim 1, wherein selecting a first receiver mode is further based on channel conditions.

12. The method of claim 1, further comprising determining required performance metric thresholds for detecting the expected signal.

13. The method of claim 1, wherein calculating the performance metric for each of the plurality of receiver modes comprises calculating an achievable performance metric and an energy consumption for each of the plurality of receiver modes.

14. The method of claim 13, wherein selecting a first receiver mode among the plurality of receiver modes is further based on the required performance metric thresholds, calculated achievable performance metric and the energy consumption.

15. A user equipment (UE) comprising:
a communication interface; and
processing circuitry connected thereto, wherein the processing circuitry is configured to:
determine one or more parameters of an expected signal;
calculate a performance metric for each of a plurality of receiver modes of the UE, based on the determined one or more parameters, wherein the plurality of receiver modes comprises two or more of a correlator mode, a decoder mode, a correlator and decoder mode, and a no signal detection mode; and
select a first receiver mode among the plurality of receiver modes based on the calculated performance metrics.

16. A non-transitory computer readable storage medium having computer readable program code embodied in the medium, the computer readable program code comprising computer readable program code configured to cause a processing circuitry of a user equipment (UE) executing the computer readable program code to:
determine one or more parameters of an expected signal;
calculate a performance metric for each of a plurality of receiver modes of the UE, based on the determined one or more parameters, wherein the plurality of receiver modes comprises two or more of a correlator mode, a decoder mode, a correlator and decoder mode, and a no signal detection mode; and
select a first receiver mode among the plurality of receiver modes based on the calculated performance metrics.

* * * * *